(12) United States Patent
Buchonina et al.

(10) Patent No.: US 7,502,966 B2
(45) Date of Patent: Mar. 10, 2009

(54) TESTCASE GENERATION VIA A POOL OF PARAMETER FILES

(75) Inventors: Olga Buchonina, Austin, TX (US); Sundeep Chadha, Austin, TX (US); Maureen Terese Davis, Round Rock, TX (US); Anh Tran Vinh, Austin, TX (US); Trac Minh Vu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 11/351,236

(22) Filed: Feb. 9, 2006

(65) Prior Publication Data

US 2007/0220339 A1 Sep. 20, 2007

(51) Int. Cl.
*G06F 11/00* (2006.01)
(52) U.S. Cl. .................... 714/33; 714/32; 716/6
(58) Field of Classification Search ............. 714/32, 714/33, 741; 716/4
See application file for complete search history.

(56) References Cited

U.S. PATENT DOCUMENTS 6,088,664 A * 7/2000 MacPherson ............... 702/183
6,148,277 A * 11/2000 Asava et al. .................. 703/22
6,212,667 B1 * 4/2001 Geer et al. ...................... 716/6
6,560,721 B1 * 5/2003 Boardman et al. ............ 714/33
7,032,133 B1 * 4/2006 Lang et al. .................... 714/33
7,194,400 B2 * 3/2007 Gabele et al. ................ 703/21
7,315,973 B1 * 1/2008 Wise ........................... 714/741
2003/0061581 A1 3/2003 Baumgartner et al.
2005/0160321 A1 * 7/2005 Cleaveland et al. .......... 714/38

* cited by examiner

*Primary Examiner*—Robert Beausoliel
*Assistant Examiner*—Philip Guyton
(74) *Attorney, Agent, or Firm*—Owen J. Gamon

(57) ABSTRACT

A current parameter file is periodically selected at random from an active pool, and testcases are generated and executed from the current parameter file against a device, where the execution of the testcases against the device hits events generated by the device over periods. A determination is made whether a number of the events hit by all testcases from the current parameter file in a current period meets a goal for the current parameter file. If the determination is false, the current parameter file is added to a miss pool if a number events for all periods for the current parameter file does not meet a goal for all periods for the current parameter file; the current parameter file is added to a retired pool if the number of events for all periods for the current parameter file meets the goal for all periods for the current parameter file; and the current parameter file is changed to another parameter file from the active pool.

14 Claims, 5 Drawing Sheets

PARAMETER FILES 172

| PARAMETER FILE ID | INPUT PARAMETERS | STATUS | |
|---|---|---|---|
| PARAMETER FILE A | WRITE MEMORY RANK_0, WRITE MEMORY RANK_1 | RETIRED | 205 |
| PARAMETER FILE B | READ MEMORY RANK_1, WRITE MEMORY RANK_2, WRITE MEMORY RANK_3 | MISS | 210 |
| PARAMETER FILE C | READ MEMORY RANK_0, WRITE MEMORY_RANK 4 | IN USE | 215 |
| PARAMETER FILE D | WRITES AND READS IN SAME ADDRESS RANGE | ACTIVE | 220 |
| PARAMETER FILE E | ADDRESSES NEAR PAGE BOUNDARY, NUMBER OF RETRIES AND DISCONNECTS | ACTIVE | 225 |

FIG. 2

FUNCTIONAL COVERAGE 174

| NUMBER OF EVENT HITS FOR CURRENT TESTCASE | NUMBER OF EVENT HITS FOR ALL TESTCASES FROM CURRENT PARAMETER FILE IN CURRENT PERIOD | NUMBER OF EVENT HITS FOR ALL TESTCASES FOR ALL PARAMETER FILES FOR ALL PERIODS |
|---|---|---|
| 5 | 17 | 40 |

| CUMULATIVE EVENT HITS FOR ALL PERIODS FOR A PARAMETER FILE 340 ||
|---|---|
| NUMBER OF EVENT HITS FOR ALL TESTCASES FOR ALL PERIODS FOR PARAMETER FILE A  340A | NUMBER OF EVENT HITS FOR ALL TESTCASES FOR ALL PERIODS FOR PARAMETER FILE B  340B |
| 12 | 23 |

FIG. 3

| | COVERAGE GOALS | 176 |
|---|---|---|
| 430 EVENT HIT GOAL FOR ALL TESTCASES FOR CURRENT PARAMETER FILE | 435 EVENT HIT GOAL FOR ALL TESTCASES FOR ALL PARAMETER FILES | |
| 25 | 250 | |

| EVENT HIT GOAL FOR ALL PERIODS FOR A PARAMETER FILE 440 | |
|---|---|
| 440A EVENT HIT GOAL FOR ALL PERIODS FOR PARAMETER FILE A | 440B EVENT HIT GOAL FOR ALL PERIODS FOR PARAMETER FILE B |
| 60 | 40 |

FIG. 4

| POOLS | | 178 |
|---|---|---|
| ACTIVE POOL 505 | MISS POOL 510 | RETIRED POOL 515 |
| 520 PARAMETER FILE ID PARAMETER FILE D PARAMETER FILE E | 525 PARAMETER FILE ID PARAMETER FILE B | 530 PARAMETER FILE ID PARAMETER FILE A |

FIG. 5

TESTCASE GENERATION VIA A POOL OF PARAMETER FILES

FIELD

This invention generally relates to verification of a hardware or software design and more specifically relates to generating testcases based on a pool of parameter files.

BACKGROUND

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, integrated circuits, circuit boards, etc.) and software (e.g., computer programs).

The typical design methodology for integrated circuit designs—such as very large scale integrated (VLSI) circuits and application specific integrated circuits (ASICs)—is conventionally divided into the following three stages. First, a design capture step is performed using, for example, a high-level language synthesis package. Next, design verification is made on the resulting design, which includes simulations, timing analysis, and automatic test pattern generation (ATPG) tools. Finally, there is layout and eventual tape out of the device. The device is then tested, and the process may need to be reiterated one or more times until the desired design criteria are satisfied.

The design capture step typically involves the specification of a logic circuit by a designer. A hardware description language ("HDL") provides the designer with a mechanism for describing the operation of the desired logic circuit in a technology-independent manner. Automated software tools take an HDL description of the integrated circuit (sometimes referred to as a behavioral or register-transfer-level description) and map it into an equivalent netlist composed of the standard cells from a selected standard cell library. This process is commonly known as "synthesis." Other software tools take a netlist comprised of standard cells and create a physical layout of the chip by placing the cells relative to each other to minimize timing delays or wire lengths, and then create electrical connections (or routing) between the cells to physically complete the desired circuit. Once a netlist has been generated from the logic design, silicon compilers, also called place and route tools, convert the netlist into a semiconductor circuit layout. The semiconductor circuit layout specifies the physical implementation of the circuit in silicon or other semiconductor materials.

Design verification involves verifying that the logic definition is correct, that the circuit implements the function expected by the designers, and that the many optimizations and transformations introduced during the design process do not alter the intended logical function of the design. Design verification may involve timing analysis and simulation tools to assess the functionality of the design. If errors are found or the resulting functionality is unacceptable, the designer modifies the design as needed. These design iterations help to ensure that the design satisfies its requirements. Formal verification (property checking) may also be used to prove correct behavior for selected aspects of the design. Formal verification is a technique that models a logic circuit as a state transition system using specifications for components in the system.

Another verification method is to generate large numbers of testcases or test programs. A traditional strategy is to manually write directed testcases that exercise specified parts of the design and run those testcases on a simulator that models the device operation. Writing such testcases is very time consuming and lacks random testing, which means covering all the legal or valid combinations of stimuli may be difficult. Also, the testcases written in this way are difficult to maintain because they lack portability and are vulnerable to any and all design changes, which causes significant modifications to the testcase bucket or regression test suite for almost every design change.

Another approach to creating testcases is to use a random testcase generator, which is often a script written in a high level language that requires the verification engineer to provide some input parameters as to what type of testcase is required. The testcase generator than randomly generates testcases based on the input parameters, which may include the commands, legal or valid ranges, and/or values for various parameters that need to be varied/changed in order to test the design. The input parameters may be passed to the testcase generation engine as a file (e.g., a parameter file). The valid commands, parameter ranges, and/or values are defined based on the design specification and the directedness of the testcases required. This approach, besides providing comparatively increased random testing, also reduces the time required to generate testcase buckets or regression test suites because the job of the verification engineer is now merely to provide the constraints to the testcase generator after understanding the design specifications and verification environment. Unfortunately, merely generating testcases randomly lacks accountability, so the testcases may run for hours with little awareness of whether they are generating, encountering, or hitting the full range of output signals or events needed to validate the design under test.

In an attempt to address the problem of lack of accountability, another technique for determining the completeness of the verification effort is to compile a comprehensive list of output signals or events that represent the various scenarios needed to validate the design under test. The problem with this technique lies in generating the proper input parameters and testcases to hit each of these events. A technique for generating the proper testcases is to harvest only testcases that hit the desired events as specified in a parameter file. The drawback to this harvesting technique is that it depends on a static bucket of testcases, or a semi-automatic generation of testcases, but with static inputs to the generation process. Thus, this harvesting technique does not guarantee that a current set of running testcases will contain a test that actually hits the desired events, and this harvesting technique may consume a significant number of simulation cycles and hardware and software resources to hit the necessary events.

Thus, without a better way to generate testcases, testing of devices will continue to suffer with a lack of complete coverage.

SUMMARY

A method, apparatus, system, and signal-bearing medium are provided. In an embodiment, a current parameter file is periodically selected at random from an active pool of parameter files and testcases are generated and executed from the current parameter file against a device, where the execution of the testcases against the device hits events generated by the device over periods. In various embodiments, periods are delimited by the execution of a threshold number of testcases or by the execution of testcases for a threshold amount of time. A determination is made whether a number of the events hit by all of the testcases from the current parameter file in a current period meets a goal for the current parameter file.

If the determination is false, the current parameter file is added to a miss pool if a number of the events for all of the periods for the current parameter file does not meet a goal for all of the periods for the current parameter file. Also, the current parameter file is added to a retired pool if the number of the events for all of the periods for the current parameter file meets the goal for all of the periods for the current parameter file. Also, the current parameter file is changed to another parameter file from the active pool.

If the determination is true, the current parameter file is added to a retired pool if a number of the events for all of the periods for the current parameter file meets a goal for all of the periods for the current parameter file. Also, the current parameter file is added back to the active pool and a current parameter file is reselected from the active pool if a number of the events for all of the testcases for all of the parameter files for all of the periods does not meet a goal for all of the testcases for all of the parameter files. Also, the active pool, the missed pool, and the retired pool are displayed if a number of the events for all of the testcases for all of the parameter files for all of the periods meets a goal for all of the testcases for all of the parameter files.

In this way, an embodiment of the invention evaluates the current parameter file to determine if the desired events have been hit without waiting until all the testcases have completed. If the desired events have not been hit, the current parameter file is changed to bias the testcases towards the desired events.

BRIEF DESCRIPTION OF THE DRAWINGS

Various embodiments of the present invention are hereinafter described in conjunction with the appended drawings:

FIG. 2 depicts a block diagram of an example data structure for parameter files, according to an embodiment of the invention.

FIG. 3 depicts a block diagram of an example data structure for functional coverage, according to an embodiment of the invention.

FIG. 4 depicts a block diagram of an example data structure for coverage goals, according to an embodiment of the invention.

FIG. 5 depicts a block diagram of an example data structure for pools, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
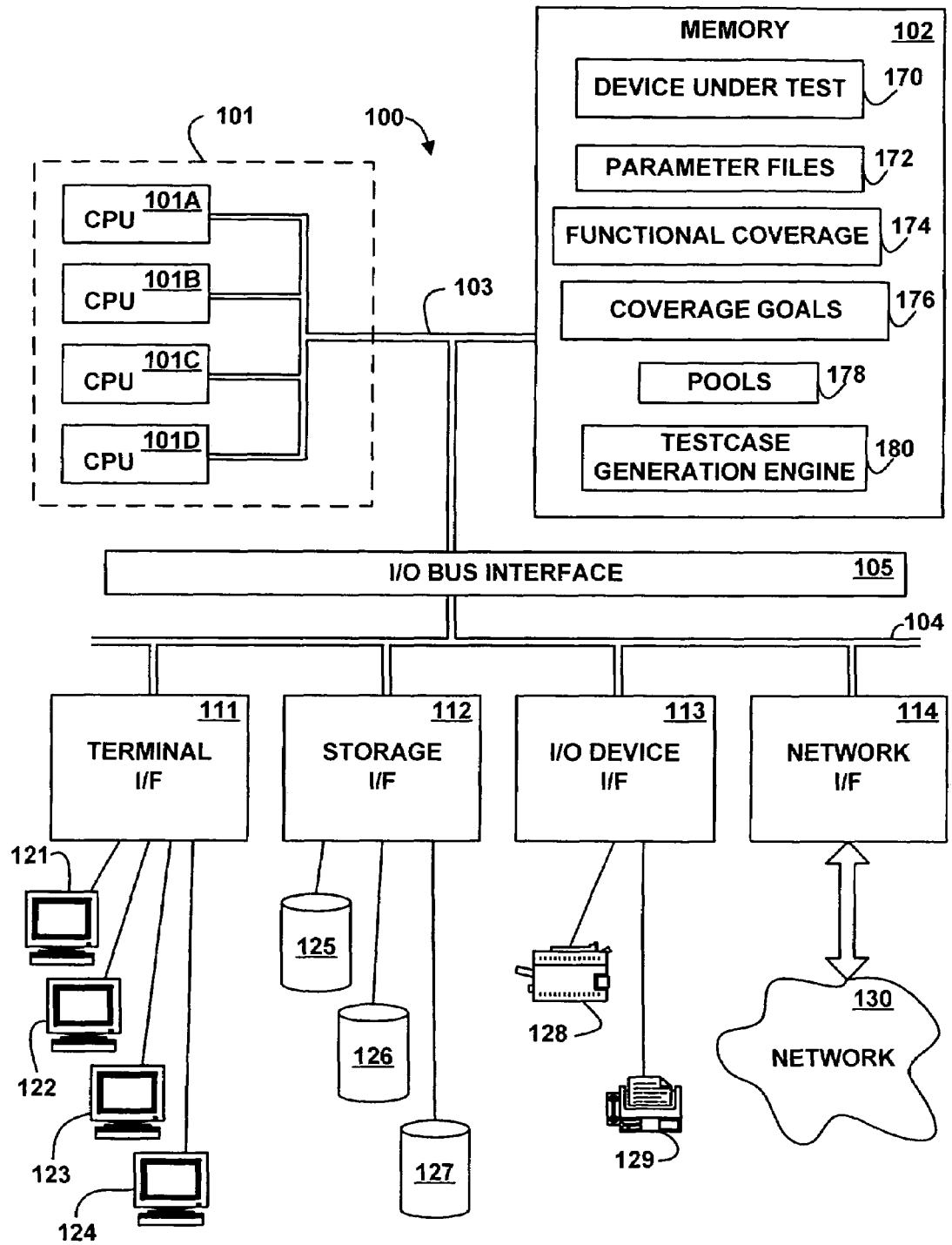
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a network 130, according to an embodiment of the present invention. In an embodiment, the hardware components of the computer system 100 may be implemented by an IBM eServer iSeries computer system. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 includes a device under test 170, parameter files 172, functional coverage 174, coverage goals 176, pools 178, and a testcase generation engine 180. Although the device under test 170, the parameter files 172, the functional coverage 174, the coverage goals 176, the pools 178, and the testcase generation engine 180 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the device under test 170, the parameter files 172, the functional coverage 174, the coverage goals 176, the pools 178, and the testcase generation engine 180 are illustrated as being contained within the main memory 102, these elements are not necessarily all completely contained in the same storage device at the same time. Further, although the device under test 170, the parameter files 172, the functional coverage 174, the coverage goals 176, the pools 178, and the testcase generation engine 180 are illustrated as being separate entities, in other embodiments some of them, or portions of some of them, may be packaged together.

The device under test 170 may be represented as a netlist or any other appropriate format or data simulation of a circuit, chip, card, or other hardware device. In another embodiment, the device under test 170 may be software program including instructions capable of executing on a processor, e.g., the processor 101, or statements capable of being interpreted by code that executes on a processor, e.g., the processor 101. Although the device under test 170 is illustrated as being contained in the memory 102, in another embodiment, the device under test 170 may be a physical hardware device that is connected to the testcase generation engine 180 via the system I/O bus 104, a cable, or other hardware mechanism.

A parameter file 172 includes a set of at least one input parameter that the testcase generation engine 180 uses to generate testcases that test the functions of the device under test 170. The term "parameter file" is used for convenience only and may refer to a file, record, row, column, item, database, directory, subdirectory, or any other identifiable collection of data. The parameter files 172 are further described below with reference to FIG. 2.

The functional coverage 174 describes the number of events that have been encountered or hit by the testcases executed against the device under test 170. The functional coverage 174 is further described below with reference to FIG. 3. The coverage goals 176 describe the goals for the number of events encountered by the testcases generated from the parameter files 172. The coverage goals 176 are further described below with reference to FIG. 4. The pools 178 describe the results of the testcases in terms of whether the functional coverage 174 of the testcases generated from the parameter files 172 met their coverage goals 176. The pools 178 are further described below with reference to FIG. 5.

In an embodiment, the testcase generation engine 180 includes instructions capable of executing on the processor 101 or statements capable of being interpreted by instructions executing on the processor 101 to perform the functions as further described below with reference to FIGS. 6 and 7. In another embodiment, the testcase generation engine 180 may be implemented in microcode. In another embodiment, the testcase generation engine 180 may be implemented in hardware via logic gates and/or other appropriate hardware techniques.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

It should be understood that FIG. 1 is intended to depict the representative major components of the computer system 100 and the network 130 at a high level, that individual components may have greater complexity than that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

FIG. 2 depicts a block diagram of an example data structure for the parameter files 172, according to an embodiment of the invention. The parameter files 172 include example records 205, 210, 215, 220, and 225, each of which includes a parameter file identifier 230, input parameters 235, and a status 240. The parameter file identifier 230 identifies the record. The input parameters 235 include input data or parameters that the testcase generation engine 180 uses to generate testcases to test the device under test 170, such as data that may be supplied as input to the device under test 170, in order to generate events, which are the various combinations or sequences of output signals or data generated as output by the device under test 170. The input parameters 235 may include any number of input parameters, and the testcase generation engine 180 is capable of generating any appropriate number of testcases based on the input parameters.

In various embodiments, a particular input parameter 235 may be certain to generate an event or a number of events or may merely increase the probability of generating an event or a number of events, e.g., based on the timing of the testcases and/or the device under test 170. For example, testcases that use an input parameter of "read to addresses that target memory controller" may eventually generate an event of "read-rank_0," testcases that use an input parameter of "processor local bus arbiter pipeline enable" may eventually result in an event of "memory controller slave rearbitration cycle," testcases that use an input parameter of "number of retires and disconnects from the slave" may eventually result in an event of "buffer under-run for a read transaction," testcases that use an input parameter of "writes to the device under test in the same address range as reads" may eventually result in an event of read pre-fetch buffer invalidation," and testcases that use an input parameter of "reads and writes addresses near the page boundary" may eventually result in an event of "read and write transactions cross page boundary during a burst."

The status 240 indicates status conditions for the parameter files, such as "in use," "active," "retired," or "miss." A status 240 of "retired" indicates that testcases generated using the input parameters 235 of the parameter file 230 have reached a goal of encountering, producing, or hitting events, so the retired parameter file is no longer used to generate testcases and is in a retired pool. A status 240 of "miss" indicates that the testcases generated using the input parameters 235 have missed their event goal or have failed to meet their event goal of encountering, producing, or hitting events, so the missed parameter files are no longer used to generate testcases and are in a miss pool. A status 240 of "in use" indicates that testcases generated using the input parameters 235 of the parameter file 230 are currently executing. A status 240 of "active" indicates that the parameter file 230 is available for generating testcases and is in an active pool.

FIG. 3 depicts a block diagram of an example data structure for the functional coverage 174, according to an embodiment of the invention. The functional coverage 174 includes the number of event hits for the current testcase 325, the cumulative number of event hits for all testcases from the current parameter file in the current period 330, the cumulative number of event hits for all testcases for all parameter files in all periods 335, and the cumulative number of event hits for all periods for a parameter file 340. The cumulative number of event hits for all periods for a parameter file 340 generically refers to the cumulative number of event hits for all periods for the parameter file A 340A, the cumulative number of event hits for all periods for a parameter B file 340B, or the cumulative number of event hits for any other parameter file. A period refers to a loop iteration of the logic of FIGS. 6 and 7, and in various embodiments periods are delimited by the execution of a threshold number of testcases or by the execution of testcases for a threshold amount of time.

FIG. 4 depicts a block diagram of an example data structure for coverage goals 176, according to an embodiment of the invention. The coverage goals 176 includes an event hit goal for all testcases for the current parameter file 430, an event hit goal for all testcases for all parameter files for all periods 435, and an event hit goal for all periods of a parameter file 440. The event hit goal for all periods of a parameter file 440 generically refers to the event hit goal for all periods of the parameter file A 440A, the event hit goal for all periods of the parameter file B 440B, or the event hit goal for any other parameter file.

FIG. 5 depicts a block diagram of an example data structure for the pools 178, according to an embodiment of the invention. The pools 178 include an active pool 505, a miss pool 510, and a retired pool 515. The active pool 505 includes parameter file identifiers 520 for the parameter files 230 that are available for generating testcases (have a status 240 of active). The miss pool 510 includes parameter file identifiers 525 for the parameter files 230 that have missed their event goal or have failed to meet their event goal of encountering or hitting events (have a status 240 of miss). The retired pool 515 includes parameter file identifiers 530 for the parameter files 230 that have achieved their event goal of encountering or hitting events (have a status 240 of retired).

Figure 6:
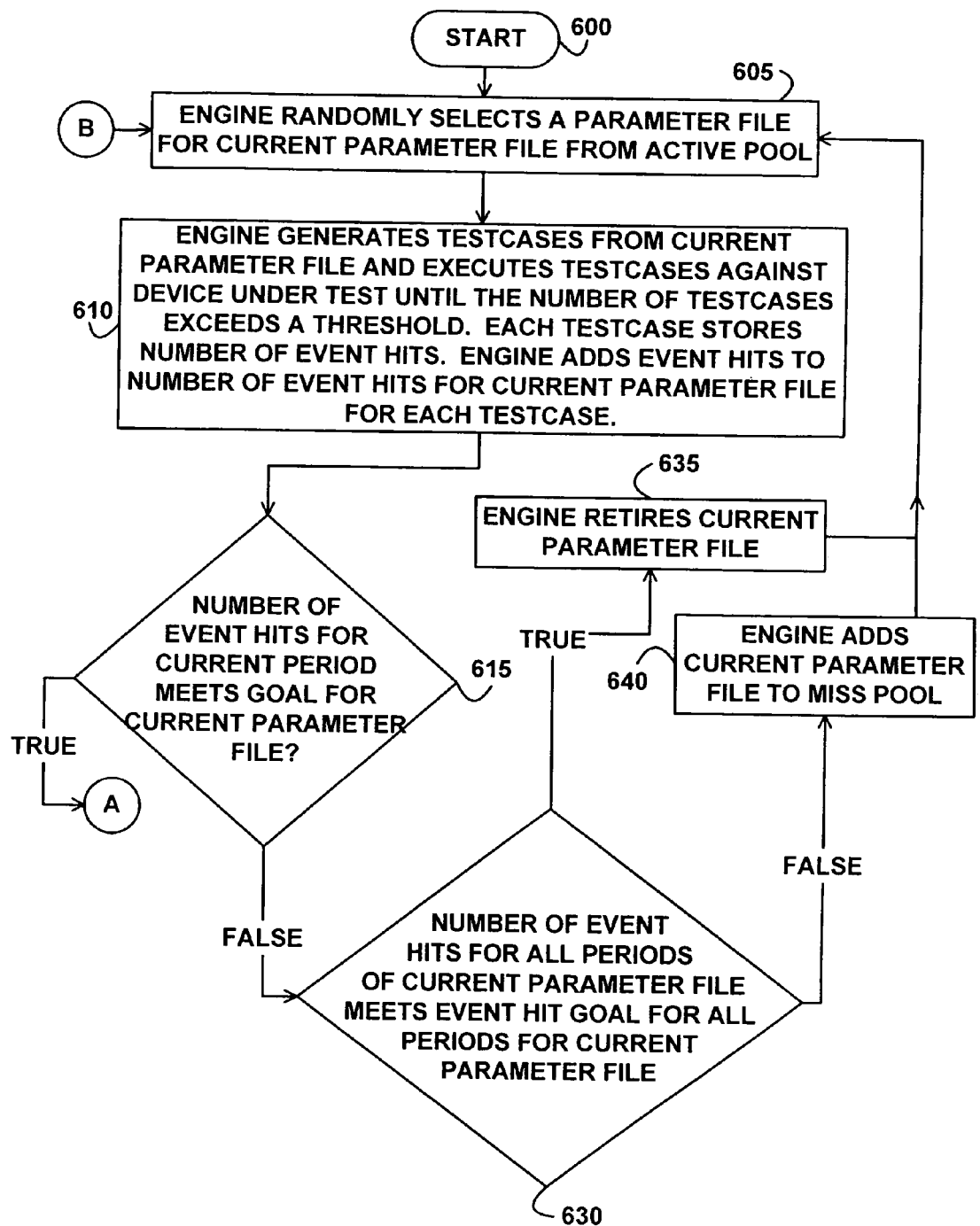
FIG. 6 depicts a flowchart for a test generation engine, according to an embodiment of the invention.

FIG. 6 depicts a flowchart for the test generation engine 180, according to an embodiment of the invention. Control begins at block 600. Control then continues to block 605 where the testcase generation engine 180 randomly selects a current parameter file 230 from the parameter files 172 that has a status 240 indicating that the parameter file 230 is active, i.e., from the active pool 505. Control then continues to block 610 where the testcase generation engine 180 generates testcases from the current parameter file and executes the testcases against the device under test 170 until a period expires. In various embodiments a period may expire in response to a threshold number of testcases or a threshold execution time period time period being reached, and the current period is represented by the current iteration of the loop that starts at block 605. After each testcase is executed, the testcase returns the number of events that were encountered or hit by the testcase, which the testcase generation engine 180 stores in the number of current event hits for the current testcase 325. After each testcase is executed, the testcase generation engine 180 further adds the number of event hits for the current testcase 325 to the cumulative number of event hits for all testcases from the current parameter file in the current period 330.

Control then continues to block 615 where the testcase generation engine 180 determines whether the cumulative number of event hits for all testcases from the current parameter file in the current period 330 meets the event hit goal for all testcases for the current parameter file 430. If the determination at block 615 is false, then the cumulative number of event hits for all testcases from the current parameter file in the current period 330 does not meet the event hit goal for all testcases for the current parameter file 430, so control continues to block 630 where the testcase generation engine 180 determines whether the cumulative number of event hits for all testcases from the current parameter file for all periods 340 meets the event hit goal for all periods of the current parameter file (e.g., 440A or 440B, depending on the current parameter file).

If the determination at block 630 is true, then the cumulative number of event hits for all testcases for all periods from the current parameter file 340 meets the event hit goal for all periods of the parameter file 440, so control continues to block 635 where the testcase generation engine 180 retires the current parameter file by adding the parameter file identifier for the current parameter file 515 to the retired pool 615 and removing the current parameter file 230 from the active pool 505 by changing the status 240 for the current parameter file to indicate that the current parameter file is retired. Control then returns to block 605, where the testcase generation engine 180 changes the current parameter file to be another parameter file from the active pool 505, as previously described above.

If the determination at block 630 is false, then the cumulative number of event hits for all testcases from the current parameter file for all periods 340 does not meet the event hit goal for all periods of the parameter file 440, so control continues to block 640 where the testcase generation engine 180 adds the current parameter file to the miss pool 510 and changes the status 240 for the current parameter file to indicate that the coverage goals for the current parameter file were missed. Control then returns to block 605, where the testcase generation engine 180 changes the current parameter file to be another parameter file from the active pool 505, as previously described above, as previously described above.

Figure 7:
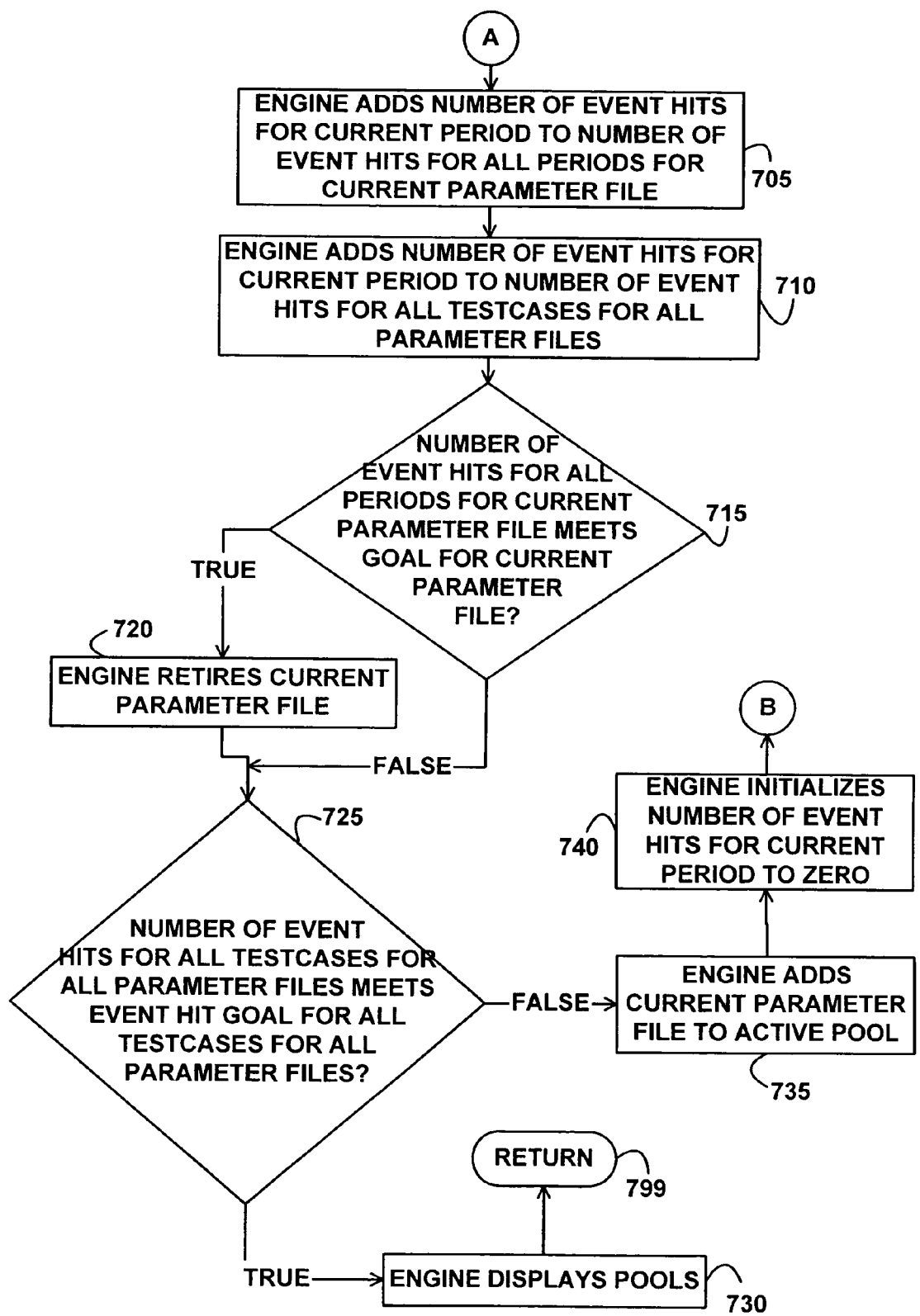
FIG. 7 depicts a further flowchart for a test generation engine, according to an embodiment of the invention.

If the determination at block 615 is true, then the cumulative number of event hits for all testcases from the current parameter file in the current period 330 does not meet the event hit goal for all testcases for the current parameter file 430, so control continues to block 705 of FIG. 7 where the testcase generation engine 180 adds the cumulative number of event hits for all testcases from the current parameter file in the current period 330 to the cumulative number of event hits for all testcases from the current parameter file for all periods 340. Control then continues to block 710 where the testcase generation engine 180 adds the cumulative number of event hits for all testcases from the current parameter file in the current period 330 to the cumulative number of event hits for all testcases for all parameter files in all periods 335.

Control then continues to block 715 where the testcase generation engine 180 determines whether the cumulative number of event hits for all periods for the current parameter file 340 meets the event hit goal for all periods of the current parameter file 440. If the determination at block 715 is true, then the cumulative number of event hits for all periods for the current parameter file 340 meets the event hit goal for all periods of the current parameter file 440, so control continues to block 720 where the testcase generation engine 180 retires the current parameter file by adding the parameter file identifier for the current parameter file to the retired pool 515 and changing the status 240 for the current parameter file to indicate that the current parameter file is retired. Control then continues to block 725 where the testcase generation engine 180 determines whether the cumulative number of event hits for all testcases for all parameter files in all periods 335 meets the event hit goal for all testcases for all parameter files for all periods 435.

If the determination at block 725 is true, then the cumulative number of event hits for all testcases for all parameter files in all periods 335 meets the event hit goal for all testcases for all parameter files for all periods 435, so control continues to block 730 where the testcase generation engine 180 displays the pools 178 (the active pool 505, the miss pool 510, and/or the retired pool 515), e.g., via the terminals 121, 122, 123, or 124. Control then continues to block 799 where the logic of FIGS. 6 and 7 returns.

If the determination at block 725 is false, then the cumulative number of event hits for all testcases for all parameter files in all periods 335 does not meet the event hit goal for all testcases for all parameter files for all periods 435, so control continues to block 735 where the testcase generation engine 180 adds the current parameter file to the active pool 505 and changes the status 240 of the current parameter file to indicate that the current parameter file is active. Control then continues to block 740 where the testcase generation engine 180 initializes the cumulative number of event hits for all testcases from the current parameter file in the current period 330 to zero. Control then returns to block 605 of FIG. 6, as previously described above.

If the determination at block 715 is false, then the cumulative number of event hits for all periods for the current parameter file 340 does not meet the event hit goal for all periods of the current parameter file 440, so control continues to block 725, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
   periodically selecting a current parameter file from an active pool of a plurality of parameter files;
   periodically generating a plurality of testcases from the current parameter file and executing the plurality of testcases against a device, wherein the executing against the device hits events generated by the device over a plurality of periods;
   determining whether a number of the events hit by all of the testcases from the current parameter file in a current period meets a goal for the current parameter file for the current period; and
   if the determining is false, adding the current parameter file to a miss pool if a number of the events for all of the periods for the current parameter file does not meet a goal for all of the periods for the current parameter file.

2. The method of claim 1, further comprising:
   if the determining is false, adding the current parameter file to a retired pool if the number of the events for all of the periods for the current parameter file meets the goal for all of the periods for the current parameter file.

3. The method of claim 2, further comprising:
   if the determining is false, changing the current parameter file to another parameter file from the active pool.

4. The method of claim 1, further comprising:
   if the determining is true, adding the current parameter file to a retired pool if a number of the events for all of the periods for the current parameter file meets the goal for all of the periods for the current parameter file.

5. The method of claim 1, further comprising:
   if the determining is true, adding the current parameter file back to the active pool and reselecting the current parameter file from the active pool if a number of the events for all of the testcases for all of the parameter files for all of the periods does not meet a goal for all of the testcases for all of the parameter files.

6. The method of claim 4, further comprising:
   if the determining is true, displaying the active pool and the retired pool if a number of the events for all of the testcases for all of the parameter files for all of the periods meets a goal for all of the testcases for all of the parameter files.

7. The method of claim 1, wherein the periodically selecting further comprises:
   randomly selecting the current parameter file from the active pool.

8. A computer-readable storage medium encoded with instructions, wherein the instructions when executed comprise:
   periodically selecting a current parameter file from an active pool of a plurality of parameter files;
   periodically generating a plurality of testcases from the current parameter file and executing the plurality of testcases against a device, wherein the executing against the device hits events generated by the device over a plurality of periods;
   determining whether a number of the events hit by all of the testcases from the current parameter file in a current period meets a goal for the current parameter file for the current period; and
   if the determining is false, adding the current parameter file to a miss pool if a number of the events for all of the periods for the current parameter file does not meet a goal for all of the periods for the current parameter file.

9. The computer-readable storage medium of claim 8, further comprising:
   if the determining is false, adding the current parameter file to a retired pool if the number of the events for all of the periods for the current parameter file meets the goat for all of the periods for the current parameter file.

10. The computer-readable storage medium of claim 9, further comprising:
    if the determining is false, changing the current parameter file to another parameter file from the active pool.

11. The computer-readable storage medium of claim 8, further comprising:
    if the determining is true, adding the current parameter file to a retired pool if a number of the events for all of the periods for the current parameter file meets a goal for all of the periods for the current parameter file.

12. The computer-readable storage medium of claim 8, further comprising:

if the determining is true, adding the current parameter file back to the active pool and reselecting the current parameter file from the active pool if a number of the events for all of the testcases for all of the parameter files for all of the periods does not meet a goal for all of the testcases for all of the parameter files.

13. The computer-readable storage medium of claim 11, further comprising:

if the determining is true, displaying the active pool, the retired pool, and the miss pool if a number of the events for all of the testcases for all of the parameter files for all of the periods meets a goal for all of the testcases for all of the parameter files.

14. The computer-readable storage medium of claim 8, wherein the periodically selecting further comprises:

randomly selecting the current parameter file from the active pool.

* * * * *